(12) United States Patent
Ishitobi et al.

(10) Patent No.: US 9,365,085 B2
(45) Date of Patent: Jun. 14, 2016

(54) BUMPER REINFORCEMENT AND METHOD OF MANUFACTURING THE SAME

(71) Applicant: Kobe Steel, Ltd., Kobe-shi (JP)

(72) Inventors: Hideki Ishitobi, Kobe (JP); Narikazu Hashimoto, Shimonoseki (JP); Tsunetake Tsuyoshi, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/331,524

(22) Filed: Jul. 15, 2014

(65) Prior Publication Data

US 2015/0048635 A1  Feb. 19, 2015

(30) Foreign Application Priority Data

Aug. 19, 2013  (JP) .................................. 2013-169730

(51) Int. Cl.
*B60R 19/48* (2006.01)
*B60D 1/56* (2006.01)
*B60D 1/24* (2006.01)
*B21J 5/06* (2006.01)
*B60R 19/18* (2006.01)

(52) U.S. Cl.
CPC ................. *B60D 1/565* (2013.01); *B21J 5/066* (2013.01); *B60D 1/243* (2013.01); *B60R 19/48* (2013.01); *B60R 2019/182* (2013.01); *Y10T 29/49618* (2015.01)

(58) Field of Classification Search
CPC ........ B60D 1/565; B60D 1/243; B60R 19/48; B60R 2019/182; B21J 5/066; Y10T 29/49618
See application file for complete search history.

(56) References Cited

U.S. PATENT DOCUMENTS

| 2004/0041416 | A1* | 3/2004 | Harrison | B60D 1/485 293/117 |
| 2005/0051994 | A1* | 3/2005 | Rodgers | B60D 1/00 280/416.1 |
| 2005/0212311 | A1* | 9/2005 | Haneda | B60D 1/565 293/117 |
| 2008/0284134 | A1* | 11/2008 | Temple | B60D 1/00 280/495 |
| 2011/0187081 | A1* | 8/2011 | Ando | B60D 1/04 280/477 |
| 2012/0066979 | A1* | 3/2012 | Brown | B60R 19/48 49/463 |
| 2012/0292930 | A1* | 11/2012 | Hermanson | B60D 1/565 293/102 |

FOREIGN PATENT DOCUMENTS

| JP | 2008-30535 | 2/2008 |
| JP | 2008-137611 | 6/2008 |
| JP | 2009-67188 | 4/2009 |

(Continued)

*Primary Examiner* — Lori L Lyjak
(74) *Attorney, Agent, or Firm* — Oblon, McClelland, Maier & Neustadt, L.L.P.

(57) ABSTRACT

A bumper reinforcement includes a tubular body including a front wall that serves as an impact surface and a rear wall on a vehicle body side, the tubular body extending in a vehicle width direction and having a hollow cross section; and a tow hook attachment structure for allowing a tow hook to be removably attached thereto. The tow hook attachment structure includes a pair of cylindrical protrusions respectively integrally formed with the front and rear walls of the tubular body by shaping parts of the walls, the cylindrical protrusions being disposed at predetermined positions on the front and rear walls in the vehicle width direction so as to face each other and so as to protrude inward into the hollow cross section, and at least one of the pair of protrusions includes a threaded portion for allowing a threaded portion of the tow hook to be screwed thereinto.

12 Claims, 11 Drawing Sheets

(56) References Cited

FOREIGN PATENT DOCUMENTS

| | | |
|---|---|---|
| JP | 2010-18047 | 1/2010 |
| JP | 2010-116129 | 5/2010 |
| JP | 2010-120026 | 6/2010 |
| JP | 2010-159005 | 7/2010 |
| JP | 2010-221742 | 10/2010 |
| JP | 2011-201513 | 10/2011 |
| JP | 2012-30624 | 2/2012 |
| WO | WO 2005/068263 A1 | 7/2005 |

* cited by examiner

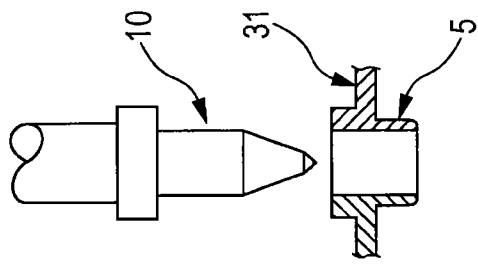
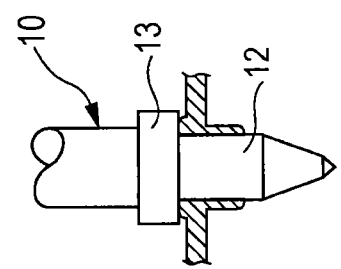
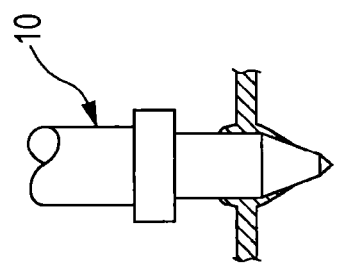
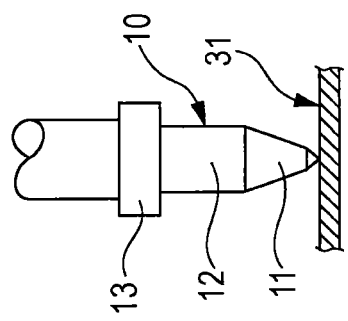

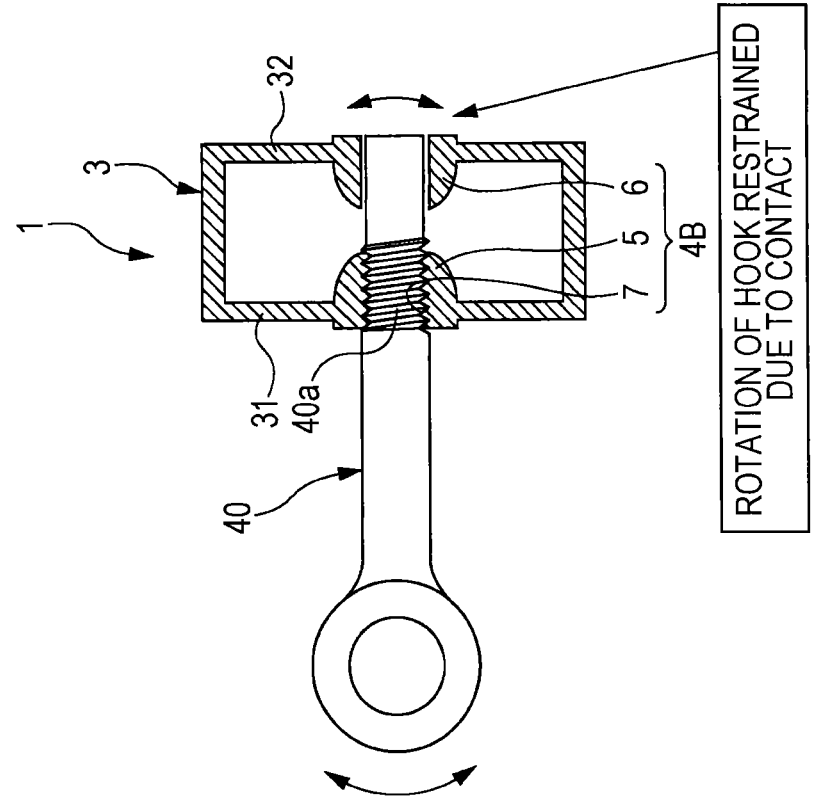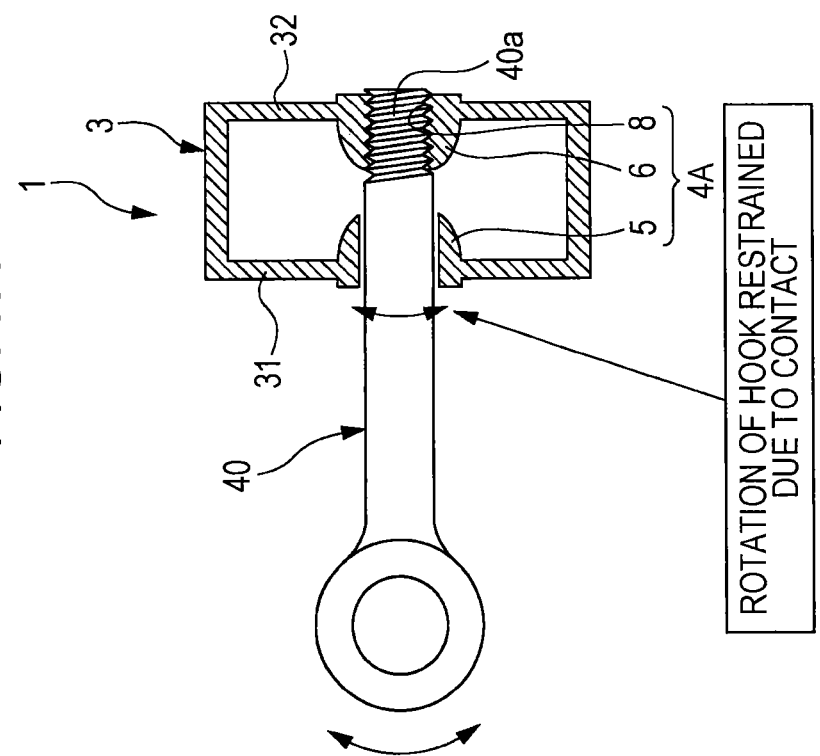

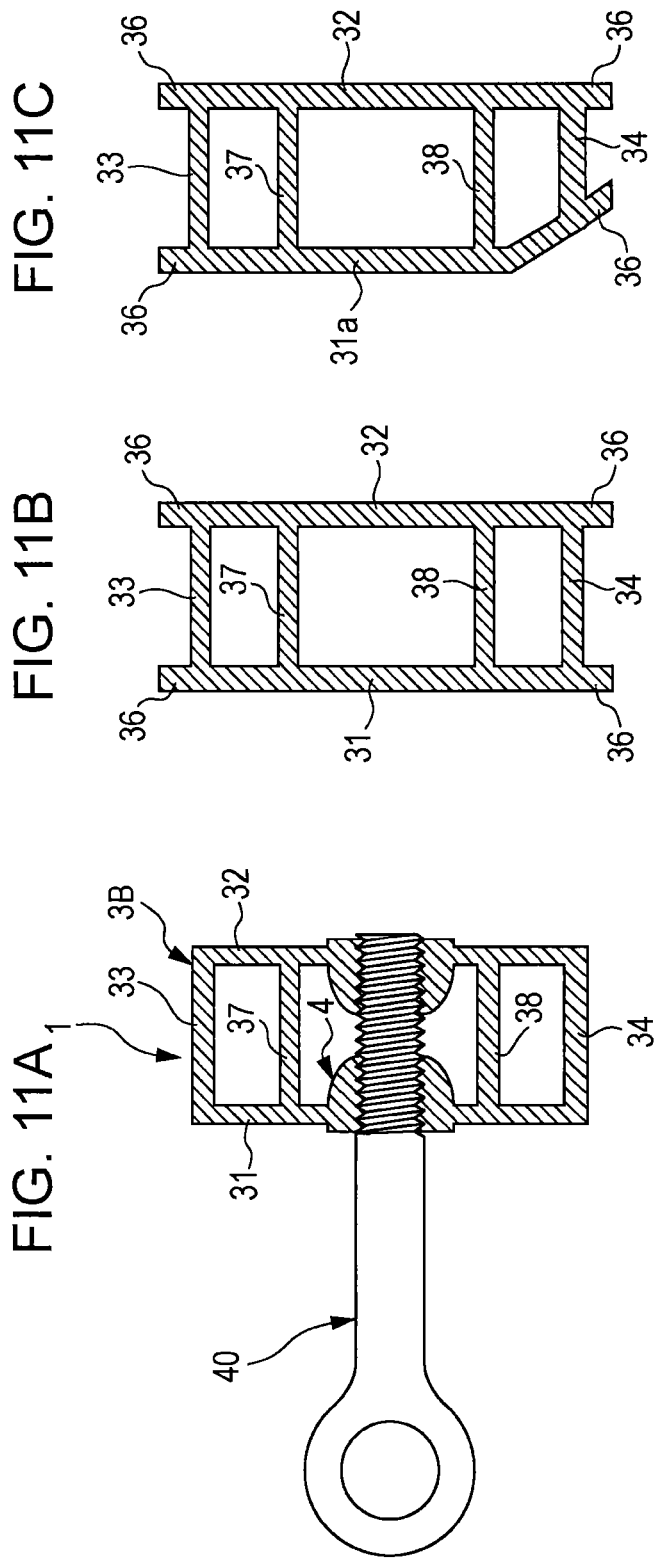

BUMPER REINFORCEMENT AND METHOD OF MANUFACTURING THE SAME

BACKGROUND OF THE INVENTION

1. Field of the Invention

The present invention relates to a bumper reinforcement including a tow hook attachment structure and a method of manufacturing the bumper reinforcement.

2. Description of the Related Art

A bumper reinforcement, which is mounted in a front portion and/or a back portion of a vehicle body, includes a tubular body (bumper reinforcement body) having a hollow cross section and extending in the vehicle width direction. The tubular body has a front wall that serves as an impact surface and a rear wall on the vehicle body side. The bumper reinforcement absorbs impact energy and protects passengers in an automobile crash.

In recent years, crash safety standards for automobiles have been made stricter, and accordingly the strength of a bumper reinforcement has been increased. On the other hand, even under such circumstances, reduction of the cost of fuel and increase of the driving performance of automobiles have been required. Therefore, increase of the strength and reduction of the weight of a bumper reinforcement, which is an impact energy absorbing component, are both required. As the material of a bumper reinforcement, a press-formed plate or an extruded member of an aluminum alloy, a press-formed product or a roll-formed product of a high-tensile steel, or the like is used.

Such a bumper reinforcement has a tow hook attachment structure for allowing a removable tow hook to be attached thereto. The tow hook is used, for example, to tow the automobile or immobilize the automobile in a car carrying ship.

In general, a tow hook attachment structure includes a tow hook attachment member attached to the aforementioned tubular body. For example, a bumper reinforcement illustrated in FIG. 2 of Japanese Unexamined Patent Application Publication No. 2009-67188 includes a block-shaped tow hook attachment member that is attached to a front wall of a tubular body of the bumper reinforcement by, in this example, welding. When the automobile is to be towed, a tow hook is attached to the bumper reinforcement by screwing a threaded portion of the tow hook into a threaded hole formed in the tow hook attachment member.

In the existing bumper reinforcement described above, the tow hook attachment member is manufactured independently, and the tow hook attachment member is attached to the tubular body (bumper reinforcement body) by welding or by using a bolt and a nut or the like. In the case where the tow hook attachment member is attached by welding, it is necessary to increase the welding length in order to ensure sufficient endurance strength, because the tubular body may become softened by welding heat and the strength of a joint portion may be decreased. As a result, there is a problem of an increase in the weight and the manufacturing cost, because the welding cost is increased and the size of the tow hook attachment member is increased. In the case where the tow hook attachment member is attached by using a bolt and a nut or the like, it is necessary to increase the size of the tow hook attachment member and the number of components in order to provide a bearing surface for the bolt and the nut or the like. As a result, there is a problem of an increase in the weight and the manufacturing cost.

SUMMARY OF THE INVENTION

An object of the present invention is to provide a bumper reinforcement including a tow hook attachment structure and a method of manufacturing the bumper reinforcement, the bumper reinforcement being obtained by performing a predetermined process on a tubular body of the bumper reinforcement, the tubular body extending in the vehicle width direction and having a hollow cross section, without attaching an independent tow hook attachment member, such as a bracket, to the tubular body.

To achieve the object, the present invention provides the following technologies.

According to a first aspect of the invention, there is provided a bumper reinforcement (first bumper reinforcement) including a tubular body including a front wall that serves as an impact surface and a rear wall on a vehicle body side, the tubular body extending in a vehicle width direction and having a hollow cross section; and a tow hook attachment structure for allowing a tow hook to be removably attached thereto. The tow hook attachment structure includes a pair of cylindrical protrusions respectively integrally formed with the front wall and the rear wall of the tubular body by shaping parts of the front wall and the rear wall, the cylindrical protrusions being disposed at predetermined positions on the front wall and the rear wall in the vehicle width direction so as to face each other and so as to protrude inward into the hollow cross section, and at least one of the pair of protrusions includes a threaded portion for allowing a threaded portion of the tow hook to be screwed thereinto.

According to a second aspect of the invention, there is provided a bumper reinforcement (second bumper reinforcement) including a tubular body including a front wall that serves as an impact surface and a rear wall on a vehicle body side, the tubular body extending in a vehicle width direction and having a hollow cross section; and a tow hook attachment structure for allowing a tow hook to be removably attached thereto. The tow hook attachment structure includes a cylindrical protrusion integrally formed with the front wall or the rear wall of the tubular body by shaping a part of the front wall or the rear wall, the cylindrical protrusion being disposed at a predetermined position on the front wall or the rear wall in the vehicle width direction so as to protrude inward into the hollow cross section, and the protrusion includes a threaded portion for allowing a threaded portion of the tow hook to be screwed thereinto.

In the bumper reinforcement according to the second aspect, a hook insertion hole for allowing the tow hook to be inserted therethrough may be formed in the front wall or the rear wall on which the protrusion is not formed.

In the bumper reinforcement according to the first or second aspect, a portion that protrudes outward from the hollow cross section may be integrally formed with each of the protrusions.

In the bumper reinforcement according to the first or second aspect, the tubular body may be made from an aluminum alloy sheet or an aluminum alloy extruded member.

According to a third aspect of the invention, there is provided a method of manufacturing a bumper reinforcement (first bumper-reinforcement-manufacturing method) including a tubular body and a tow hook attachment structure for allowing a tow hook to be removably attached thereto, the tubular body including a front wall that serves as an impact surface and a rear wall on a vehicle body side, the tubular body extending in a vehicle width direction and having a hollow cross section. The method includes a step of forming a pair of cylindrical protrusions respectively integrally with the front wall and the rear wall of the tubular body by shaping parts of the front wall and the rear wall, the cylindrical protrusions being disposed at predetermined positions on the front wall and the rear wall in the vehicle width direction so as to face each other and so as to protrude inward into the hollow cross section; and a step of forming a threaded portion for allowing a threaded portion of the tow hook to be screwed thereinto in at least one of the pair of protrusions.

In the method of manufacturing a bumper reinforcement according to the third aspect, in a case where the threaded portion is to be formed in each of the pair of protrusions in the step of forming the threaded portion, the threaded portions are formed in the protrusions so as to extend from the front wall side through the protrusion of the front wall and the protrusion of the rear wall by tapping.

According to a fourth aspect of the invention, there is provided a method of manufacturing a bumper reinforcement (second bumper-reinforcement-manufacturing method) including a tubular body and a tow hook attachment structure for allowing a tow hook to be removably attached thereto, the tubular body including a front wall that serves as an impact surface and a rear wall on a vehicle body side, the tubular body extending in a vehicle width direction and having a hollow cross section. The method includes a step of forming a cylindrical protrusion integrally with the front wall or the rear wall of the tubular body by shaping a part of the front wall or the rear wall, the cylindrical protrusion being disposed at a predetermined position on the front wall or the rear wall in the vehicle width direction so as to protrude inward into the hollow cross section; and a step of forming a threaded portion for allowing a threaded portion of the tow hook to be screwed thereinto in the protrusion.

In the method of manufacturing a bumper reinforcement according to the third aspect, in the step of forming the protrusions, each of the protrusions may be formed from an inner peripheral portion of a hole formed by friction heat generated by using a rotary drilling tool.

In the method of manufacturing a bumper reinforcement according to the fourth aspect, in the step of forming the protrusion, the protrusion may be formed from an inner peripheral portion of a hole formed by friction heat generated by using a rotary drilling tool.

With the bumper reinforcement or the method of manufacturing the bumper reinforcement according to the present invention, by performing a predetermined process on a tubular body of the bumper reinforcement, the tubular body extending in the vehicle width direction and having a hollow cross section, it is not necessary to provide an independent tow hook attachment member, such as a bracket, and to attach the tow hook attachment member to the tubular body by welding or by using a bolt and a nut or the like, in contrast to existing technologies. Therefore, the manufacturing cost can be reduced as compared with existing technologies, and a bumper reinforcement including a tow hook attachment structure can be realized without increasing the weight.

BRIEF DESCRIPTION OF THE DRAWINGS

FIGS. 3A to 3D are sectional views illustrating a method of forming a protrusion according to the present invention;

FIGS. 7A and 7B illustrate first bumper reinforcements according to other embodiments of the present invention, FIG. 7A showing a schematic sectional view of a tow hook attachment structure including a rear wall having a threaded portion and a tow hook attached thereto, and FIG. 7B showing a schematic sectional view of a tow hook attachment structure including a front wall having a threaded portion and a tow hook attached thereto;

FIGS. 11A to 11C are schematic sectional views illustrating first bumper reinforcements according to the present invention each including a tubular body having a three-part cross section;

DESCRIPTION OF THE PREFERRED EMBODIMENTS

A first bumper reinforcement according to the present invention includes a tubular body (bumper reinforcement body) including a front wall that serves as an impact surface and a rear wall on a vehicle body side, the tubular body extending in a vehicle width direction and having a hollow cross section; and a tow hook attachment structure. The tow hook attachment structure includes a pair of cylindrical protrusions respectively integrally formed with the front wall and the rear wall of the tubular body by shaping parts of the front wall and the rear wall without additionally providing an independent component, the cylindrical protrusions being disposed at predetermined positions on the front wall and the rear wall in the vehicle width direction so as to face each other and so as to protrude inward into the hollow cross section, and at least one of the pair of protrusions includes a threaded portion for allowing a threaded portion of the tow hook to be screwed thereinto.

A second bumper reinforcement according to the present invention includes the tubular body and the tow hook attachment structure. The tow hook attachment structure includes a cylindrical protrusion formed from the front wall or the rear wall of the tubular body, the cylindrical protrusion being disposed at a predetermined position on the front wall or the rear wall in the vehicle width direction so as to protrude inward into the hollow cross section, and the protrusion includes a threaded portion for allowing a threaded portion of the tow hook to be screwed thereinto.

First and second methods for manufacturing bumper reinforcements according to the present invention are respectively methods for manufacturing first and second bumper reinforcements described above, the methods including a step of forming the cylindrical protrusion(s).

Hereinafter, embodiments of the present invention will be described with reference to the drawings.

Figure 1:
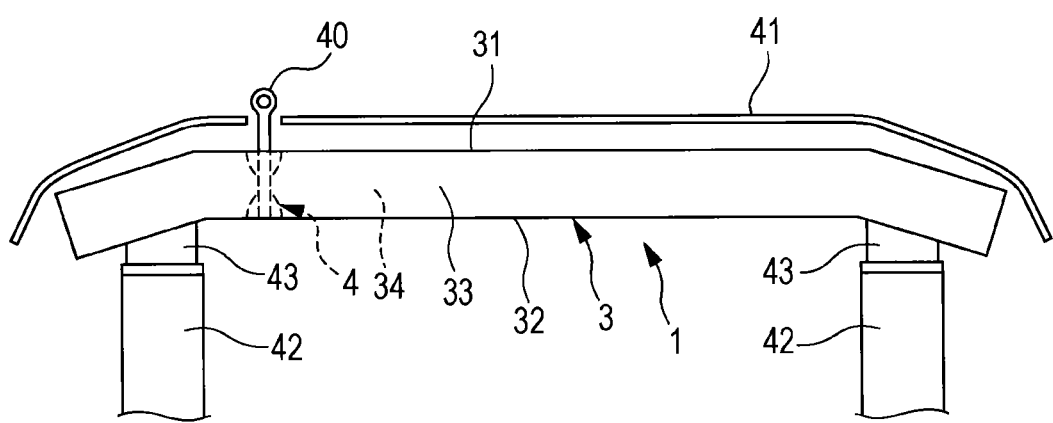
FIG. 1 is a schematic plan view of a first bumper reinforcement according to the present invention, to which a tow hook is attached.

FIG. 1 is a schematic plan view of a first bumper reinforcement according to the present invention, to which a tow hook is attached;

As illustrated in FIG. 1, a first bumper reinforcement 1 according to the present invention is disposed between a bumper fascia 41, which is mounted in a front portion and/or a rear portion of a vehicle body of an automobile, and a bumper stay 43, which is attached to a vehicle body frame member 42, such as a side member.

The first bumper reinforcement 1 includes a tubular body 3 (bumper reinforcement body), which has a hollow cross section and extends in the vehicle width direction, and a tow hook attachment structure 4 that allows a tow hook 40 to be removably attached thereto.

Figure 2A:
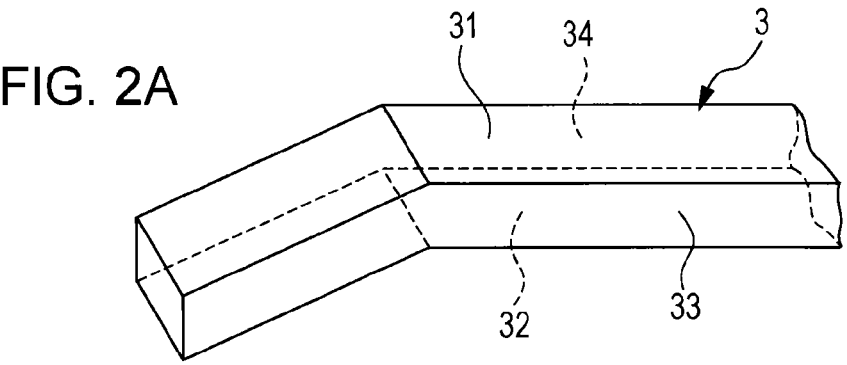
FIGS. 2A to 2D illustrate a method of manufacturing the first bumper reinforcement shown in FIG. 1, FIG. 2A showing a schematic perspective view of a tubular body, FIG. 2B showing a schematic perspective view of the bumper reinforcement including a tow hook attachment structure, FIG. 2C showing a schematic sectional view (taken along IIC-IIC of FIG. 2B) of protrusions formed in a protrusion-forming step, and FIG. 2D showing a schematic sectional view of a tow hook attachment structure obtained through a threading step.
Figure 2B:
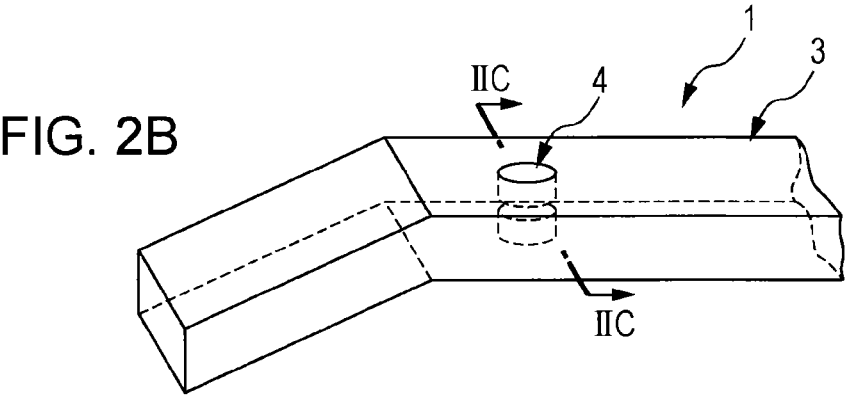
Figure 2C:
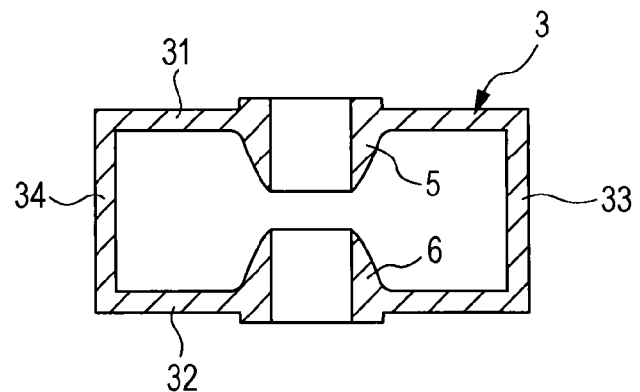
Figure 2D:
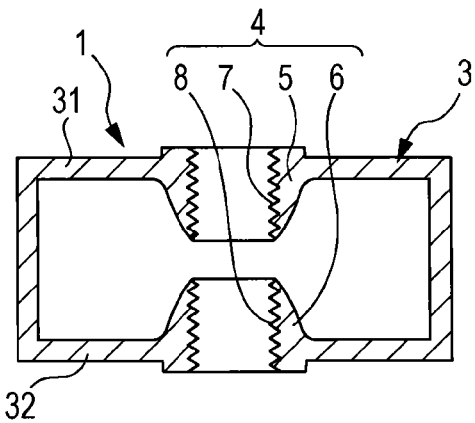

FIGS. 2A to 2D illustrate a method of manufacturing the first bumper reinforcement shown in FIG. 1, FIG. 2A showing a schematic perspective view of a tubular body, FIG. 2B showing a schematic perspective view of the bumper reinforcement including a tow hook attachment structure, FIG. 2C showing a schematic sectional view (taken along IIC-IIC of FIG. 2B) of protrusions formed in a protrusion-forming step, and FIG. 2D showing a schematic sectional view of a tow hook attachment structure obtained through a threading step. FIGS. 3A to 3D are sectional views illustrating a method of forming a protrusion according to the present invention.

The tubular body 3 includes a front wall 31, which serves as an impact surface; a rear wall 32 on the vehicle body side; and an upper side wall 33 and a lower side wall 34 connecting the front wall 31 and the rear wall 32 to each other. For convenience of drawing, the front wall 31 faces upward and the rear wall 32 faces downward in FIGS. 2A to 2D. The tubular body 3 is made from an aluminum alloy sheet or an aluminum alloy extruded member. As illustrated in FIG. 2A, in the present embodiment, the tubular body 3 has a hollow rectangular cross section. The tubular body 3 is made by cutting an aluminum alloy extruded member, which is made of a JIS 7000 series aluminum alloy (Al—Zn—Mg—(Cu) alloy), in a direction perpendicular to the extrusion direction so as to have a predetermined length. Both end portions of the tubular body 3 are bent at a predetermined angle toward the vehicle body. Using an aluminum alloy extruded member is suitable for obtaining a bumper reinforcement having such a shape, because a long member having a substantially the same (uniform) cross-sectional shape over the entire length in the longitudinal direction can be easily manufactured by heat extrusion.

As illustrated in FIG. 2B, the tow hook attachment structure 4 is disposed at a predetermined position in the tubular body 3 in the vehicle width direction. As illustrated in FIGS. 2C and 2D, the tow hook attachment structure 4 includes cylindrical protrusions 5 and 6, which are respectively integrally formed with the front wall 31 and the rear wall 32 by shaping parts of the front wall 31 and the rear wall 32. The protrusions 5 and 6 are formed at predetermined positions on the front and rear walls 5 and 6 in the vehicle width direction. The protrusions 5 and 6 face each other and protrude inward into a hollow cross section of the bumper reinforcement. At least one of the protrusions 5 and 6 includes a female threaded portion. In the present embodiment, the protrusions 5 and 6 respectively include female-threaded portions 7 and 8, into which a male-threaded portion 40a of the tow hook 40 (see FIG. 6) is screwed.

First, referring to FIGS. 3A to 3D, a method of forming the protrusions 5 and 6 of the tow hook attachment structure 4 will be described.

A drill bit 10 (rotary drilling tool) shown in FIGS. 3A to 3D is a drill that does not have a cutting edge. A drill bit of this type is called a flowdrill (registered trademark). The drill bit 10 is connected to, for example, the rotation shaft of a drilling machine. First, the drill bit 10 is lowered while being rotated at a high speed, and a conical tip 11 of the drill bit 10 is pressed against the front wall 31 of the tubular body 3 (FIG. 3A). The front wall 31 is heated and softened by friction heat, thereby forming a hole in the front wall 31. The drill bit 10 is further pressed to expand and extend the hole by causing the softened portion to plastically flow along a shank 12 of the drill bit 10, thereby forming a protrusion extending vertically along the drill bit 10 (FIG. 3B).

When the drill bit 10 is lowered further, a lower protrusion becomes the cylindrical protrusion 5 and an upper protrusion becomes a short protrusion (outer protrusion). The protrusion 5 protrudes inward into a hollow cross section from the front wall 31 along the outer peripheral surface the shank 12. The short protrusion is formed by being pressed by a flange 13 of the drill bit 10 so as to protrude outward by a small length from the hollow cross section of the front wall 31.

Thus, the cylindrical protrusion 5 is formed from an inner peripheral portion of the hole formed by friction heat generated by using the drill bit 10. As illustrated in FIG. 2C, the cylindrical protrusion 5 protrudes from the front wall 31 inward into a hollow cross section. Likewise, the cylindrical protrusion 6 is formed on the rear wall 32 so as to protrude inward into a hollow cross section and so as to face the protrusion 5.

Next, a method of forming a female-threaded portion of a tow hook attachment structure will be described.

As illustrated in FIG. 2D, in the case of forming the female-threaded portions 7 and 8 respectively in the protrusions 5 and 6 of the first bumper reinforcement 1, screw cutting using a tap is performed from the front wall side through the protrusion 5 of the front wall 31 and the protrusion 6 of the rear wall 32. Thus, the tow hook 40 can be attached to and removed from the tow hook attachment structure 4 without causing displacement of the thread (phase displacement) from the front wall 31 to the rear wall 32.

Next, referring to FIGS. 4A to 5, another method of forming a protrusion of the first bumper reinforcement will be described. Note that this method can be used to form a protrusion in the second bumper reinforcement.

FIGS. 4A to 4D are sectional views illustrating another method (a press-forming method using a slide die) of forming protrusions according to the present invention.

Figure 4A:
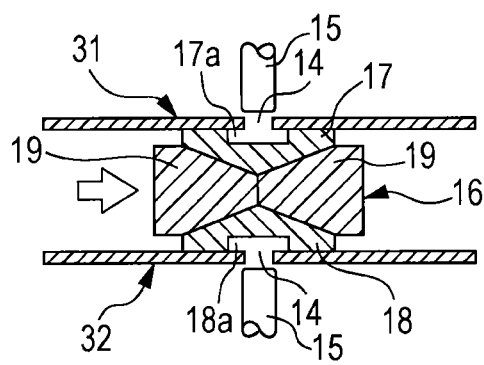
FIGS. 4A to 4D are sectional views illustrating another method (a press-forming method using a slide die) of forming protrusions according to the present invention.

As illustrated in FIG. 4A, circular holes 14, which are pilot holes facing each other, are respectively formed in the front wall 31 and the rear wall 32 of the tubular body 3. A pair of cylindrical punches 15, which can be moved closer to the tubular body 3 from above and from below, are each attached to piston rod of a hydraulic cylinder (not shown). A slide die 16 includes a holder 17 that supports the front wall 31 from the inside, a holder 18 that supports the rear wall 32 from the inside, and a pair of slide portions 19. The slide portions 19 are interposed between the holders 17 and 18 and move the holders 17 and 18 closer to or away from each other. The slide die 16 is inserted into the tubular body 3 from an opening at an end of the tubular body 3. Circular recesses 17a and 18a are respectively formed in the holders 17 and 18.

Figure 4B:
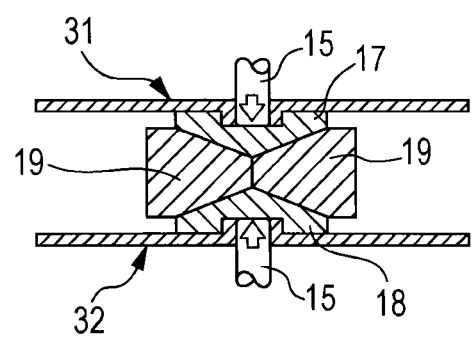

First, as illustrated in FIG. 4B, press-forming (burring) is performed to form a cylindrical protrusion 5A (flange) on the front wall 31 and a cylindrical protrusion 6A on the rear wall 32 as follows. While holding the holders 17 and 18 at support positions at which the holders 17 and 18 are separated from each other, the circular hole 14 in the front wall 31 and the circular hole 14 in the rear wall 32 are simultaneously pressed with the punches 15, and thereby edges of the circular holes 14 are made to protrude inward.

Figure 4C:
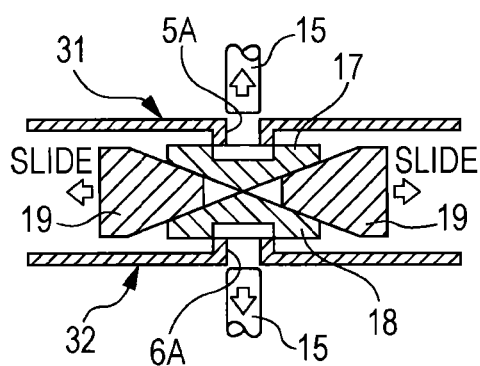
Figure 4D:
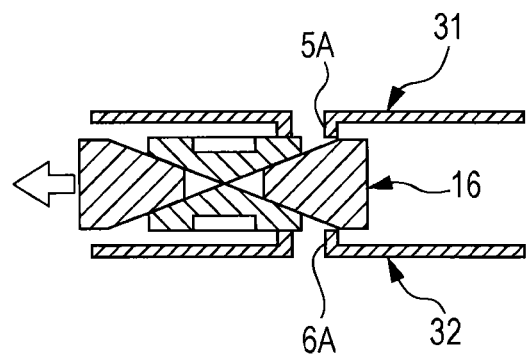

As illustrated in FIG. 4C, after the protrusions 5A and 6A have been formed, the slide portions 19 are slid so as to be separated from each other and withdrawn from a position between the holders 17 and 18, and thereby the holders 17 and 18 are moved to clearance positions at which apexes thereof are in contact with each other by slightly raising the lower punch 15. As illustrated in FIG. 4D, the entirety of the slide die 16 is taken out through the opening at the end of the tubular body 3.

Figure 5:
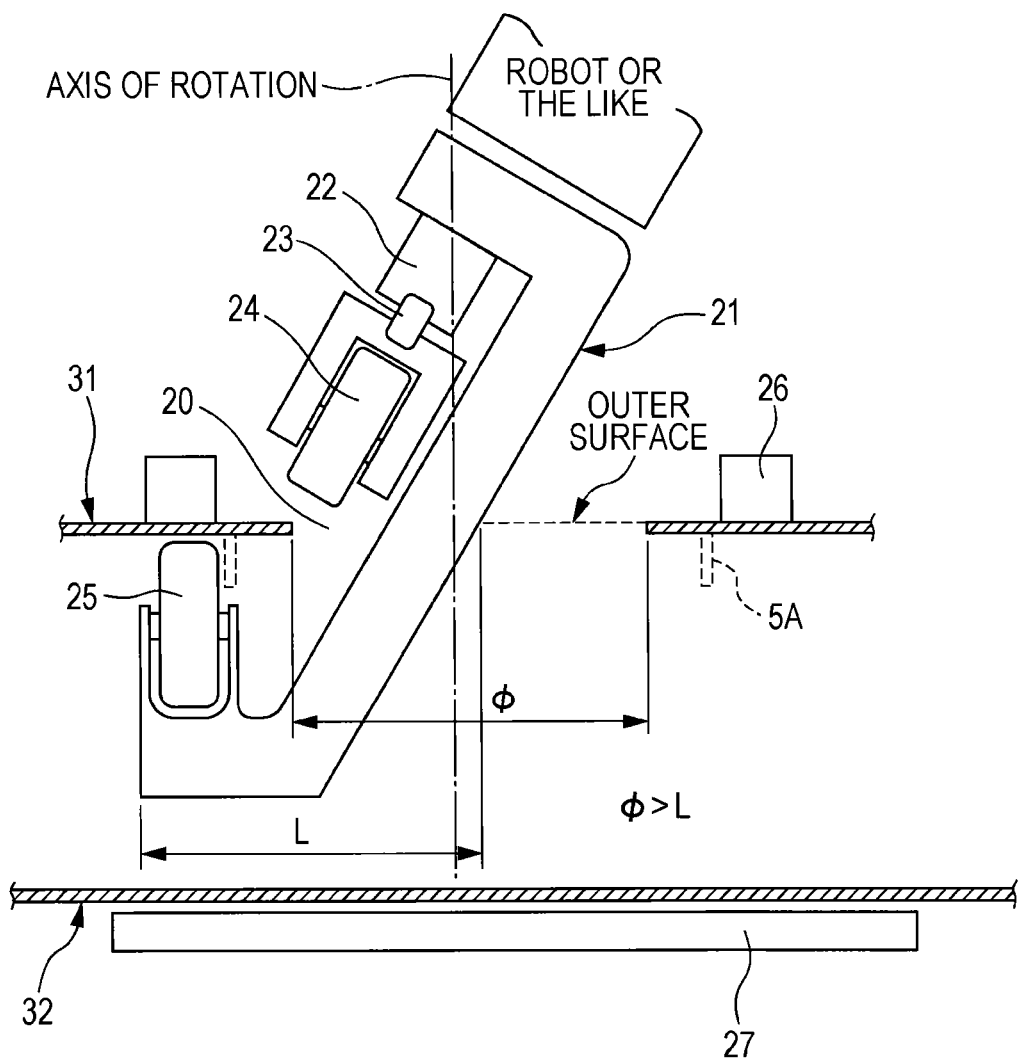
FIG. 5 is a sectional view illustrating another method (a roll-forming method) of forming a protrusion according to the present invention.

FIG. 5 is a sectional view illustrating another method (a roll-forming method) of forming a protrusion according to the present invention.

As illustrated in FIG. 5, a circular hole 20, which has a diameter φ and which serves as a pilot hole, is formed in the front wall 31 of the tubular body 3. A roller holding arm 21 has an angular U-shape. A bending roller 24 and an inner press roller 25, which are rotatable, are attached to the roller holding arm 21. The bending roller 24 is moved forward and backward by a piston rod 23 of a cylinder 22 from a position diagonally above an edge of the circular hole 20. The inner press roller 25, which is disposed inside the tubular body 3, forms the protrusion 5A in corporation with the bending roller 24. The roller holding arm 21 is configured to be attached to, for example, a wrist portion of a robot. An upper fixing jig 26 and a lower fixing jig 27 are also shown in FIG. 5.

As illustrated in FIG. 5, a dimension L satisfies a relationship φ>L, so that the protrusion 5A can be formed in the circular hole 20 having a diameter φ. In the cross sectional view shown in FIG. 5, the dimension L is the distance from the point of intersection of an extension line of an outer surface of the front wall 31 in the circular hole 20 and the roller holding arm 21 that is set on the tubular body 3 to an end of the roller holding arm 21 in the direction of the extension line.

By rotating the roller holding arm 21 once around the axis of rotation shown in FIG. 5, roll-forming is performed to make the edge of the circular hole 20 protrude inward using the bending roller 24 to form the cylindrical protrusion 5A (flange) on the front wall 31. Likewise, a protrusion can be formed on the rear wall 32.

Figure 6:
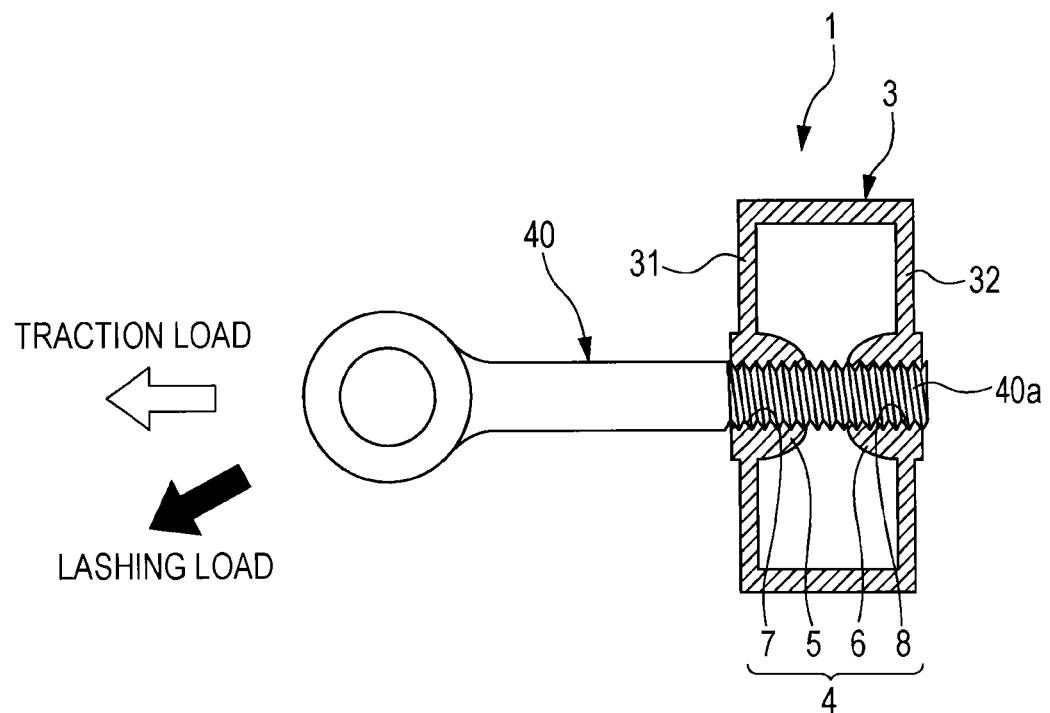
FIG. 6 is a schematic sectional view illustrating the first bumper reinforcement shown in FIG. 1 and a tow hook attached thereto.

FIG. 6 is a schematic sectional view illustrating the first bumper reinforcement shown in FIG. 1 and a tow hook attached thereto.

In the first bumper reinforcement 1, the female-threaded portions 7 and 8 are respectively formed in the protrusions 5 and 6 of the front wall 31 and the rear wall 32 of the tubular body 3. Therefore, a traction load is applied to the tow hook 40 in a forward direction indicated by a blank arrow in FIG. 6. Accordingly, the traction load applied to the tow hook attachment structure 4 through the tow hook 40 can be sufficiently supported. Moreover, a lashing load is applied to the tow hook 40 in a diagonally downward direction indicated by a solid arrow in FIG. 6.

Accordingly, the lashing load applied to the tow hook attachment structure 4 through the tow hook 40 can be sufficiently supported.

FIGS. 7A and 7B illustrate first bumper reinforcements according to other embodiments of the present invention, FIG. 7A showing a schematic sectional view of a tow hook attachment structure including a rear wall having a threaded portion and a tow hook attached thereto, and FIG. 7B showing a schematic sectional view of a tow hook attachment structure including a front wall having a threaded portion and a tow hook attached thereto.

In a case where an endurance strength lower than that of the one shown in FIG. 6 is required for the first bumper reinforcement 1, as illustrated in FIGS. 7A and 7B, a female-threaded portion may be formed in one of the protrusions 5 and 6 of the front wall 31 and the rear wall 32.

A first bumper reinforcement 1 shown in FIG. 7A has a tow hook attachment structure 4A in which a female-threaded portion 8 is formed in the protrusion 6 of the rear wall 32 of the tubular body 3 on the vehicle body side. In this case, if an external force is applied to rotate the tow hook 40 in the vehicle height direction or in the vehicle width direction around a region in which the thread of the tow hook 40 engages with the thread of the protrusion 6, rotation of the tow hook 40 is prevented because an unthreaded portion of the tow hook 40 contacts the protrusion 5 of the front wall 31.

A first bumper reinforcement 1 shown in FIG. 7B has a tow hook attachment structure 4B in which a female-threaded portion 7 is formed in the protrusion 5 of the front wall 31 of the tubular body 3 on the impact surface side. In this case, if an external force is applied to rotate the tow hook 40 in the vehicle height direction or in the vehicle width direction around a region in which the thread of the tow hook 40 engages with the thread of the protrusion 5, rotation of the tow hook 40 is prevented because an unthreaded portion of the tow hook 40 contacts the protrusion 6 of the rear wall 32.

Figure 8:
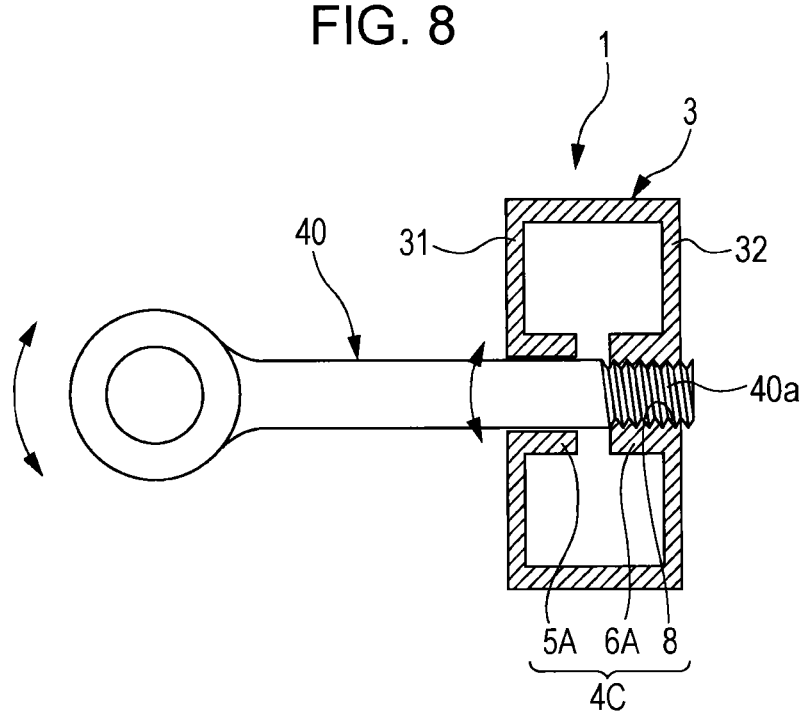
FIG. 8 is a schematic sectional view illustrating a first bumper reinforcement according to another embodiment of the present invention and a tow hook attached thereto.

FIG. 8 is a schematic sectional view illustrating a first bumper reinforcement according to another embodiment of the present invention and a tow hook attached thereto.

A first bumper reinforcement 1 shown in FIG. 8 includes a tow hook attachment structure 4C including protrusions 5A and 6A that are formed by using the press-forming method or the roll forming method described above. As in the first bumper reinforcement shown in FIG. 7A, in the tow hook attachment structure 4C of the first bumper reinforcement 1, a female-threaded portion 8 is formed in the protrusion 6A of the rear wall 32 of the tubular body 3. In this case, if an external force is applied to rotate the tow hook 40 in the vehicle height direction or in the vehicle width direction around a region in which the thread of the tow hook 40 engages with the thread of the protrusion 6A, rotation of the tow hook 40 is prevented because an unthreaded portion of the tow hook 40 contacts the protrusion 5A of the front wall 31.

Figure 9:
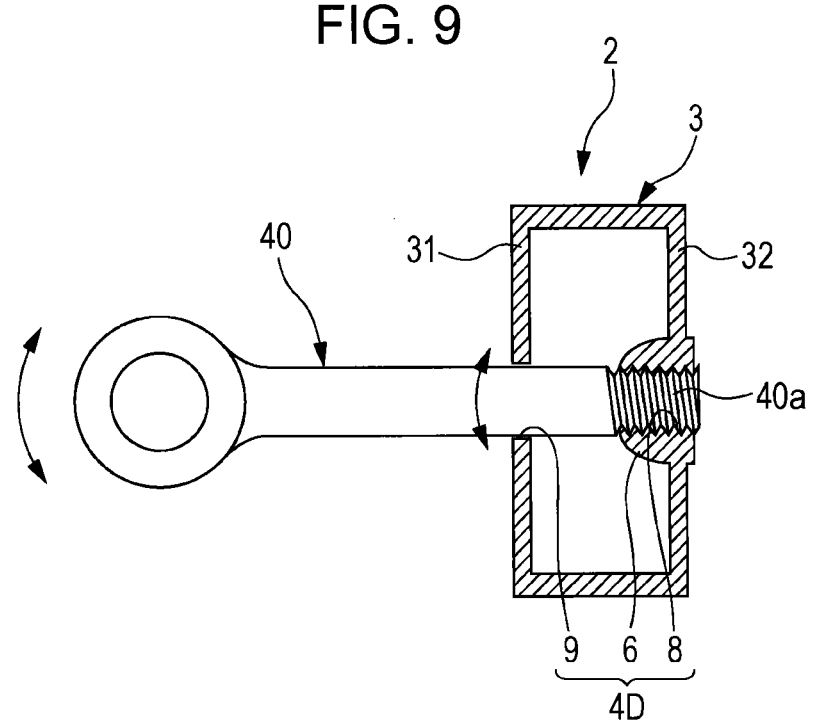
FIG. 9 is a schematic sectional view illustrating a second bumper reinforcement according to an embodiment of the present invention and a tow hook attached thereto.

FIG. 9 is a schematic sectional view illustrating a second bumper reinforcement according to an embodiment of the present invention and a tow hook attached thereto.

As illustrated in FIG. 9, a second bumper reinforcement 2 includes a tow hook attachment structure 4D including a protrusion 5, a female-threaded portion 8 formed in the protrusion 5, and a hook insertion hole 9 formed in the front wall 31. In the present embodiment, the protrusion 5 is formed on the rear wall 32, which is one of the front wall 31 and the rear wall 32 of the tubular body 3. The hook insertion hole 9 allows a tow hook 40 to be inserted therethrough.

The second bumper reinforcement 2 can be used if a required endurance strength is lower than that of the bumper reinforcement shown in FIG. 6 and if the front wall 31 does not become deformed even when an external force is applied to the tow hook 40 so as to rotate the tow hook 40 in the vehicle height direction or the vehicle width direction. In this case, the manufacturing cost can be reduced, because it is only necessary to form a hole in the front wall 31 and it is not necessary to form a protrusion on the front wall 31.

Figure 10C:
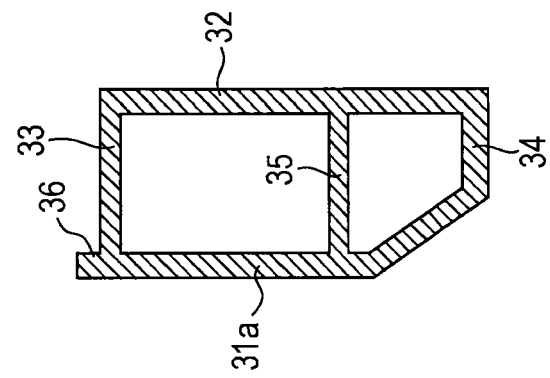
FIGS. 10A to 10C are schematic sectional views illustrating first bumper reinforcements according to the present invention each including a tubular body having a two-part cross section.
Figure 10B:
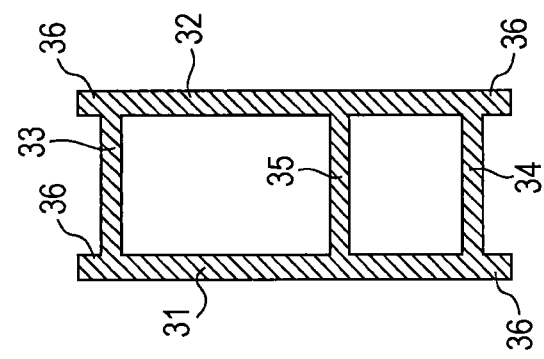
Figure 10A:
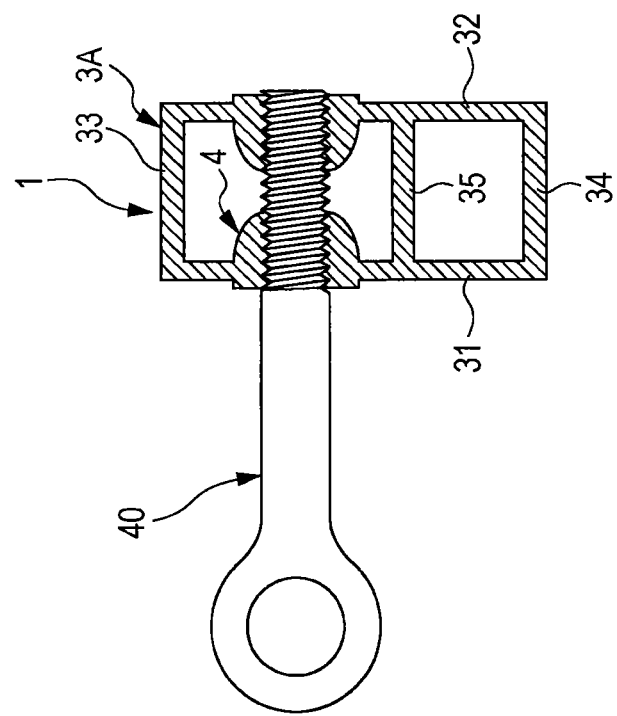

FIGS. 10A to 10C are schematic sectional views illustrating first bumper reinforcements according to the present invention each including a tubular body having a two-part cross section.

As illustrated in FIG. 10A, the first bumper reinforcement 1 includes a tubular body 3A and a tow hook attachment structure 4. The tubular body 3A is made from an aluminum alloy extruded member that is made of a JIS 7000 series alloy and that has a two-part cross section. The tubular body 3A includes a reinforcement rib 35 (inner horizontal wall), which is disposed between an upper side wall 33 and a lower side wall 34.

Alternatively, the tubular body 3A may have, for example, one of structures illustrated in FIGS. 10B and 10C. The tubular body 3A shown in FIG. 10B includes protruding flange portions 36, which are formed at upper and lower ends of the front wall 31 and the rear wall 32. The tubular body 3A shown in FIG. 10C has such a structure that a lower end portion of a front wall 31a is inclined toward the rear wall 32 and therefore the size of a lower hollow portion of the tubular body 3A decreases downward.

FIGS. 11A to 11C are schematic sectional views illustrating first bumper reinforcements according to the present invention each including a tubular body having a three-part cross section.

As illustrated in FIG. 11A, the first bumper reinforcement 1 includes a tubular body 3B and a tow hook attachment structure 4. The tubular body 3B is made from an aluminum alloy extruded member that is made of a JIS 7000 series alloy and that has a three-part cross section. The tubular body 3A includes first and second reinforcement ribs 37 and 38, which are disposed between an upper side wall 33 and a lower side wall 34.

Alternatively, the tubular body 3B may have, for example, one of structure illustrated in FIGS. 11B and 11C. The tubular body 3B shown in FIG. 11B includes protruding flange portions 36, which are formed at upper and lower ends of the front wall 31 and the rear wall 32. The tubular body 3A shown in FIG. 11C has such a structure that a lower end portion of the front wall 31a is inclined toward the rear wall 32 and therefore the size of the lowest hollow portion of the tubular body 3B decreases downward.

Figure 12:
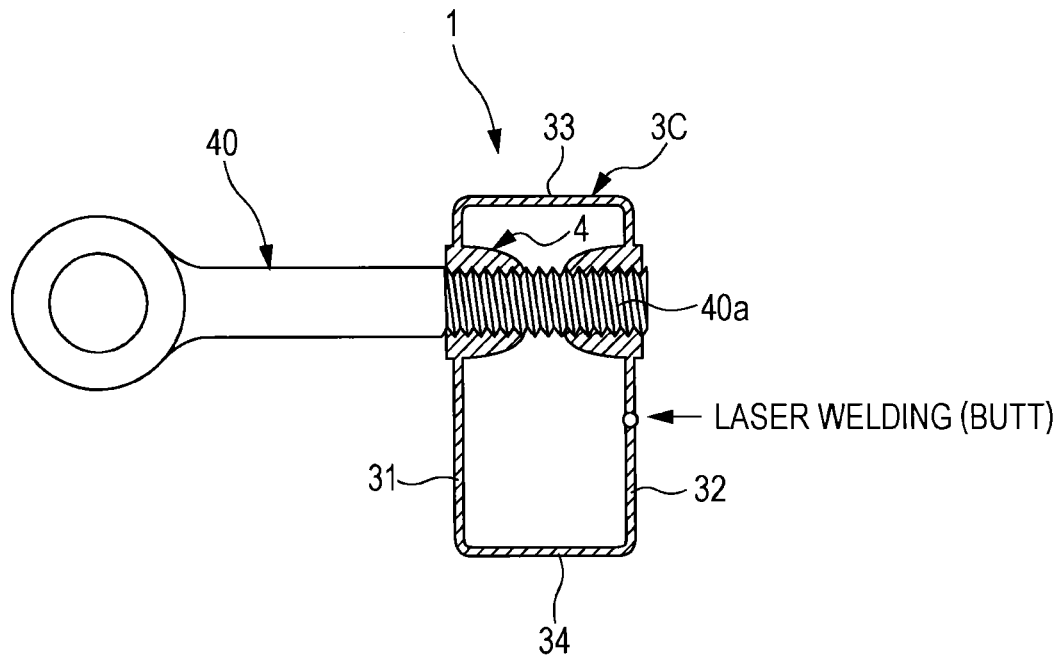
FIG. 12 is a schematic sectional view of a first bumper reinforcement according to the present invention including a tubular body formed by using a roll-forming method.

FIG. 12 is a schematic sectional view of a first bumper reinforcement according to the present invention including a tubular body formed by using a roll-forming method.

As illustrated in FIG. 12, the first bumper reinforcement 1 includes a tubular body 3C and a tow hook attachment structure 4. The tubular body 3C is made by roll-forming a high-tensile steel sheet or an aluminum alloy sheet so as to have a hollow cross section, the aluminum alloy sheet (rolled sheet) being made of a JIS 6000 or JIS 7000 series alloy. A roll-forming method is a technology that is suitable for mass-producing long metal products having a uniform cross section. In a roll-forming method, the shape of a flat sheet is gradually changed while the sheet is nipped between a large number of pairs of upper and lower forming rollers that are arranged. In the present embodiment, a joint portion of the tubular body 3C is formed by laser-welding butt joint portions to each other without using a filler metal.

Figure 13:
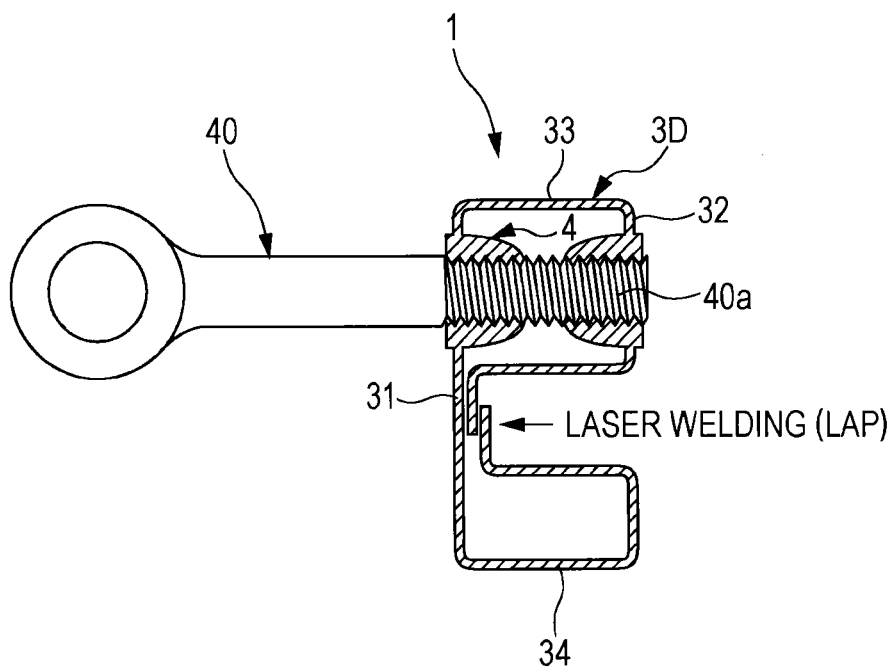
FIG. 13 is a schematic sectional view of a first bumper reinforcement according to the present invention including another tubular body formed by using a roll-forming method.

FIG. 13 is a schematic sectional view of a first bumper reinforcement according to the present invention including another tubular body formed by using a roll-forming method.

As illustrated in FIG. 13, the first bumper reinforcement 1 includes a tubular body 3D and a tow hook attachment structure 4. The tubular body 3D is made by roll-forming a high-tensile steel sheet so as to have a B-shaped cross section. In the present embodiment, a joint portion of the tubular body 3D is formed by laser-welding lap joint portions to each other without using a filler metal.

Thus, with the first and second bumper reinforcements 1 and 2 described above, by performing a predetermined process on a tubular body of the bumper reinforcement, the tubular body extending in the vehicle width direction and having a hollow cross section, it is not necessary to provide an independent tow hook attachment member, such as a bracket, and to attach the tow hook attachment member to the tubular body by welding or by using a bolt and a nut or the like, in contrast to existing technologies. Therefore, the manufacturing cost can be reduced as compared with existing technologies, and a bumper reinforcement including a tow hook attachment structure can be realized without increasing the weight.

In the case where a protrusion (outer protrusion) is formed on the outside of the hollow cross section of the tubular body as illustrated in FIGS. 2A to 2D, 6, 7A and 7B, and 9 to 13, the length of the protrusion can be increased and a portion of a tow hook having a length larger than the distance between the front and rear walls of the tubular body can be restrained, so that rotation of the tow hook can be more effectively prevented. Moreover, because a threaded portion (female-threaded portion) is formed also in the outer protrusion, a load applied to the tow hook can be reliably supported. The outer protrusion having such a function is also integrally formed with the tubular body of the bumper reinforcement.

In a case where a bumper reinforcement according to the present invention is to be made from an aluminum alloy, in order to reduce the weight and increase the energy absorption performance of the bumper reinforcement by increasing the strength and reducing the thickness of each portion, it is preferable to use an extruded member or a rolled sheet made of a JIS 6000 series or JIS 7000 series aluminum alloy. Between these, it is preferable to use a JIS 7000 series alloy, which has an Al—Zn—Mg composition or an Al—Zn—Mg—Cu composition in the ranges specified in JIS standards or AA standards and which has a higher strength. Such an aluminum alloy is, after having been hot extruded or rolled, subjected to treatments, such as solution-treatment and quenching (T4 temper), aging treatment (T6 temper), over-aging treatment (T7 temper), and is used as a material for a vehicle bumper reinforcement.

In a case where a bumper reinforcement according to the present invention is made of an aluminum alloy, it is not necessary to perform a surface treatment, such as anti-corrosion treatment. In a case where a steel sheet is used, it is necessary to perform anti-corrosion surface treatment. Even in the case where a bumper reinforcement according to the present invention is made of an aluminum alloy, if the bumper reinforcement is to be joined to an automobile part made of steel or iron, it is preferable to insulate the aluminum alloy portion from the steel or iron-made portion by interposing a resin member (which may also serve as a joint member) at joint portions thereof in order to prevent galvanic corrosion due to a potential difference between these materials. Alternatively, surface treatment, such as Dacrotizing, may be performed on the steel portion.

What is claimed is:

1. A bumper reinforcement comprising:
a tubular body formed of a metal material, the tubular body including a front wall that serves as an impact surface and a rear wall on a vehicle body side, the tubular body extending in a vehicle width direction and having a hollow cross section;
a tow hook attachment structure for allowing a tow hook to be removably attached thereto, wherein the tow hook attachment structure includes
a pair of cylindrical protrusions respectively integrally formed with the front wall and the rear wall of the tubular body by shaping parts of the front wall and the rear wall, the cylindrical protrusions being disposed at predetermined positions on the front wall and the rear wall in the vehicle width direction so as to face each other and so as to protrude inward into the hollow cross section, and
threading formed in the material of the tubular body for allowing a threaded portion of the tow hook to be screwed thereinto, wherein the threading extends to at least one of the pair of protrusions and is also formed in the at least one of the pair of protrusions.

2. A bumper reinforcement comprising:
a tubular body formed of a metal material, the tubular body including a front wall that serves as an impact surface and a rear wall on a vehicle body side, the tubular body extending in a vehicle width direction and having a hollow cross section; and
a tow hook attachment structure for allowing a tow hook to be removably attached thereto, wherein the tow hook attachment structure includes
a cylindrical protrusion integrally formed with the front wall or the rear wall of the tubular body by shaping a part of the front wall or the rear wall, the cylindrical protrusion being disposed at a predetermined position on the front wall or the rear wall in the vehicle width direction so as to protrude inward into the hollow cross section, and
threading formed in the material of the tubular body for allowing a threaded portion of the tow hook to be screwed thereinto, wherein the threading extends to the protrusion and is also formed in the protrusion.

3. The bumper reinforcement according to claim 2, wherein a hook insertion hole for allowing the tow hook to be inserted therethrough is formed in the front wall or the rear wall on which the protrusion is not formed.

4. The bumper reinforcement according to claim 1, wherein a portion that protrudes outward from the hollow cross section is integrally formed with each of the protrusions.

5. The bumper reinforcement according to claim 2, wherein a portion of the tubular body that protrudes outward from the hollow cross section is integrally formed with the protrusion.

6. The bumper reinforcement according to claim 3, wherein a portion of the tubular body that protrudes outward from the hollow cross section is integrally formed with the protrusion.

7. The bumper reinforcement according to claim 1, wherein the tubular body is made from an aluminum alloy sheet or an aluminum alloy extruded member.

8. The bumper reinforcement according to claim 2, wherein the tubular body is made from an aluminum alloy sheet or an aluminum alloy extruded member.

9. The bumper reinforcement according to claim 3, wherein the tubular body is made from an aluminum alloy sheet or an aluminum alloy extruded member.

10. The bumper reinforcement according to claim 4, wherein the tubular body is made from an aluminum alloy sheet or an aluminum alloy extruded member.

11. The bumper reinforcement according to claim 5, wherein the tubular body is made from an aluminum alloy sheet or an aluminum alloy extruded member.

12. The bumper reinforcement according to claim 6, wherein the tubular body is made from an aluminum alloy sheet or an aluminum alloy extruded member.

* * * * *